(12) United States Patent
Rarick

(10) Patent No.: US 9,069,612 B2
(45) Date of Patent: Jun. 30, 2015

(54) CARRY LOOK-AHEAD ADDER WITH GENERATE BITS AND PROPAGATE BITS USED FOR COLUMN SUMS

(75) Inventor: Leonard D. Rarick, San Diego, CA (US)

(73) Assignee: ARM Finance Overseas Limited, Cambridge (GB)

( * ) Notice: Subject to any disclaimer, the term of this patent is extended or adjusted under 35 U.S.C. 154(b) by 475 days.

(21) Appl. No.: 13/538,984

(22) Filed: Jun. 29, 2012

(65) Prior Publication Data

US 2014/0006470 A1    Jan. 2, 2014

(51) Int. Cl.
*G06F 7/50* (2006.01)
*G06F 7/508* (2006.01)

(52) U.S. Cl.
CPC . *G06F 7/50* (2013.01); *G06F 7/508* (2013.01)

(58) Field of Classification Search
CPC ................................. G06F 7/506; G06F 7/508
USPC .................................................. 708/710–713
See application file for complete search history.

(56) References Cited

U.S. PATENT DOCUMENTS

| | | | |
|---|---|---|---|
| 6,199,090 B1 * | 3/2001 | Mansingh et al. ............ | 708/672 |
| 7,152,089 B2 * | 12/2006 | Harris ........................... | 708/710 |
| 2002/0174158 A1 * | 11/2002 | Sutherland et al. ........... | 708/710 |
| 2003/0115237 A1 * | 6/2003 | Fletcher ........................ | 708/711 |
| 2009/0138537 A1 * | 5/2009 | Iwaki ............................ | 708/710 |

\* cited by examiner

*Primary Examiner* — Chuong D Ngo
(74) *Attorney, Agent, or Firm* — Patterson Thuente Pedersen, P.A.

(57) ABSTRACT

A carry look-ahead adder includes an input stage to produce generate bits and propagate bits from input signals. An output stage produces output sums exclusively from the generate bits, the propagate bits and carry in bits.

4 Claims, 4 Drawing Sheets

CARRY LOOK-AHEAD ADDER WITH GENERATE BITS AND PROPAGATE BITS USED FOR COLUMN SUMS

FIELD OF THE INVENTION

This invention relates generally to integrated circuits. More particularly, this invention is directed toward a carry look-ahead adder using generate bits, propagate bits and carry in bits for determining the column sums instead of the input operands and carry in bits.

BACKGROUND OF THE INVENTION

FIG. 1 illustrates a carry look-ahead adder 100 to add two four bit values and a carry input. One four bit value is denominated $A_0$, $A_1$, $A_2$ and $A_3$, while a second four bit value is denominated $B_0$, $B_1$, $B_2$ and $B_3$. The carry input is denominated $C_0$. Each input is gated through a flip-flop 102. The input values, say $A_3$ and $B_3$, are processed to form a generate bit $G_3$ and a propagate bit $P_3$. The generate bit is produced in accordance with a logical AND function at AND gate 104, while the propagate bit is produced in accordance with a logical OR function at OR gate 106. Accordingly, for the given possible inputs, the outputs of Table 1 are produced.

TABLE 1

| Input A | Input B | Generate Value from logical AND function | Propagate Value from Logical OR function |
| --- | --- | --- | --- |
| 0 | 0 | 0 | 0 |
| 0 | 1 | 0 | 1 |
| 1 | 0 | 0 | 1 |
| 1 | 1 | 1 | 1 |

The inputs are also applied to an eXclusive-OR gate (XOR) 108. That is, the inputs operate as a sum operand at the XOR gate 108. The other sum operand is from logical OR gate 110. Logical OR gate 110 receives an input from logical AND gate 112, which has a carry in input $C_0$.

In FIG. 1, the gating flip-flops 102 are before the generate and propagate logic. If the flip-flops are positioned after the generate and propagate logic, a larger number of flip-flops is required, as shown in FIG. 2.

FIG. 2 illustrates a carry look-ahead adder 200 with flip-flops 202 positioned after the generate and propagate logic. Consequently, 17 flip-flops are required, as opposed to the configuration of FIG. 1, which requires 9 flip flip-flops at the input. This proliferation of flip-flops is attributable to the need to gate the input signals that operate as a sum operand for XOR gate 108.

This is a common problem when registers (e.g., flip-flops) are placed within a functional unit (e.g., a carry look-ahead adder). A functional unit commonly has a fan-out of logic, resulting in more signal lines within the functional unit than there are at the inputs and outputs of the functional unit. The additional registers increase power consumption, heat generation and the silicon footprint. It is desirable to minimize register use since registers require much more space than logical gates and consume more power, thereby producing more heat.

Registers provide an important timing or gating function and therefore the location where they are used is carefully chosen. Timing constraints sometimes require the utilization of registers within a functional unit. Consequently, it would be desirable to provide an architecture that allows for register placement within a functional unit, while maintaining the same number of registers utilized by register placement external to the functional unit.

SUMMARY OF THE INVENTION

A carry look-ahead adder includes an input stage to produce generate bits and propagate bits from input signals. An output stage produces output sums exclusively from the generate bits, the propagate bits and carry in bits.

A processor includes a multiply unit with a carry look-ahead adder having an input stage to produce generate bits and propagate bits from input signals. An output stage produces output sums exclusively from the generate bits, the propagate bits and carry in bits.

A computer includes a bus, input devices connected to the bus, output devices connected to the bus, a processor connected to the bus. The processor includes a carry look-ahead adder that processes sum operands comprising generate bits and propagate bits as sorted inputs.

A non-transitory computer readable storage medium includes executable instructions to describe a processor with a multiply unit with a carry look-ahead adder that processes sum operands comprising generate bits and propagate bits as sorted inputs.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
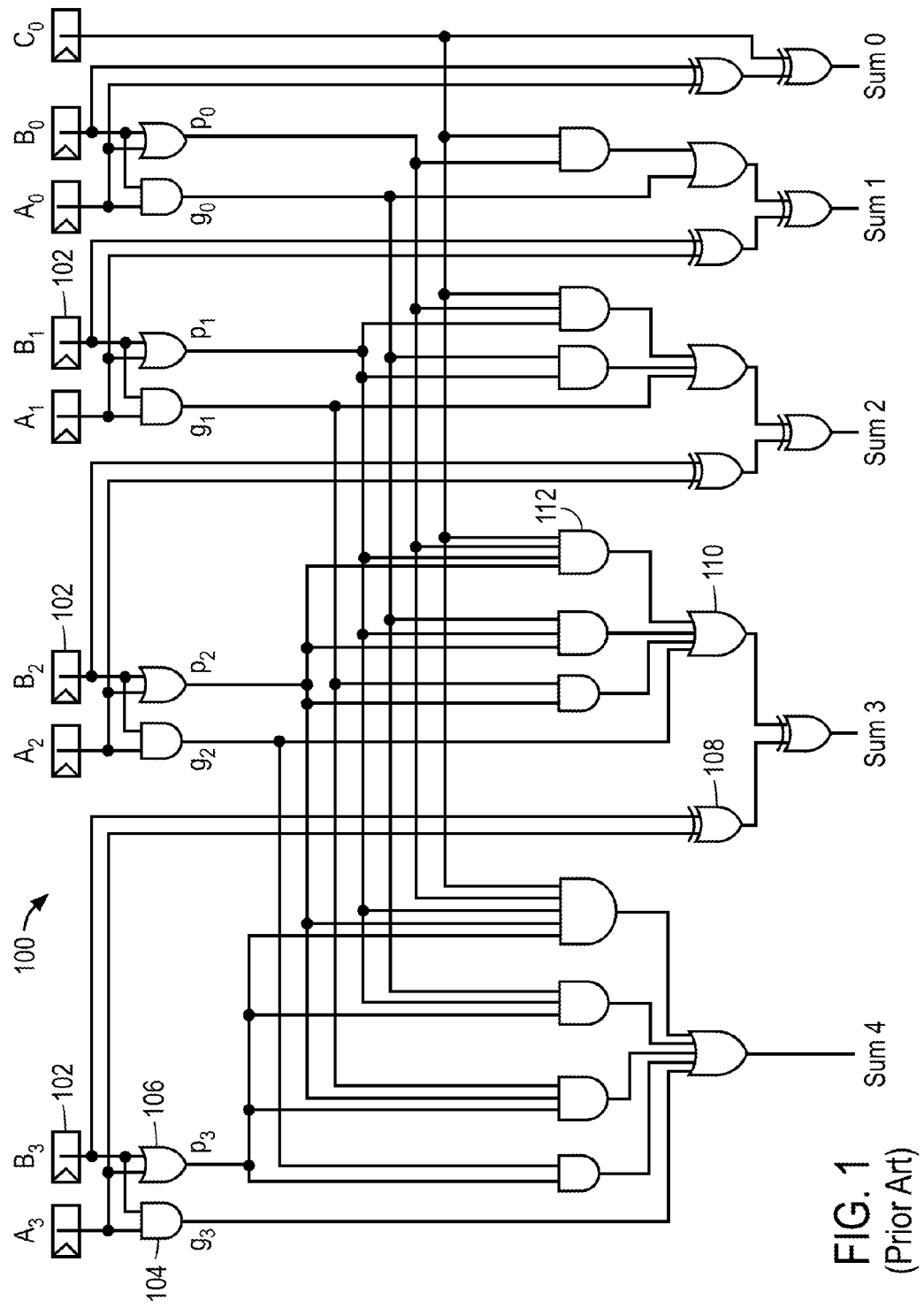
FIG. 1 illustrates a prior art carry look-ahead adder.
Figure 2:
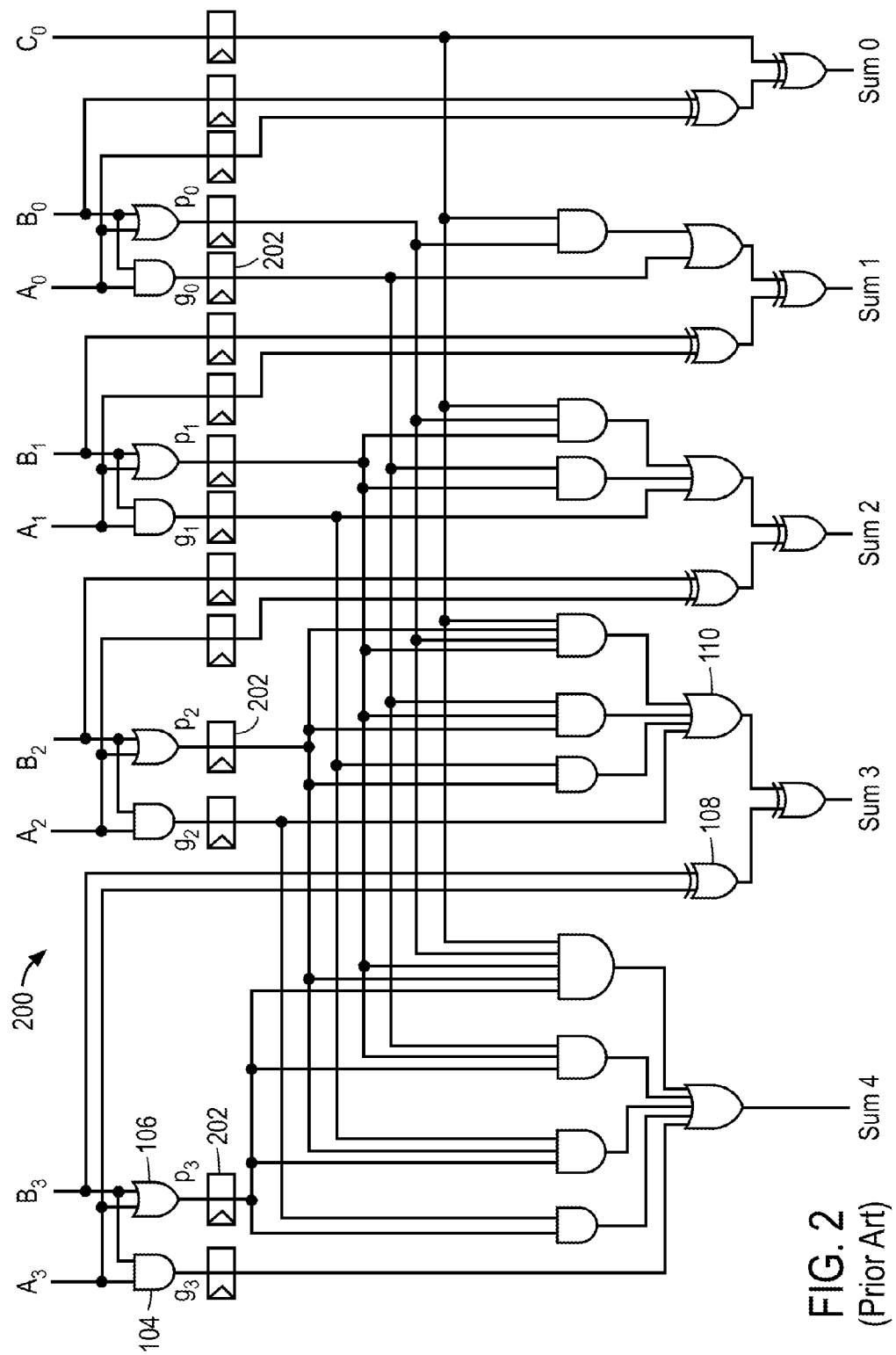
FIG. 2 illustrates the problem of register proliferation in a prior art carry look-ahead adder.
Figure 3:
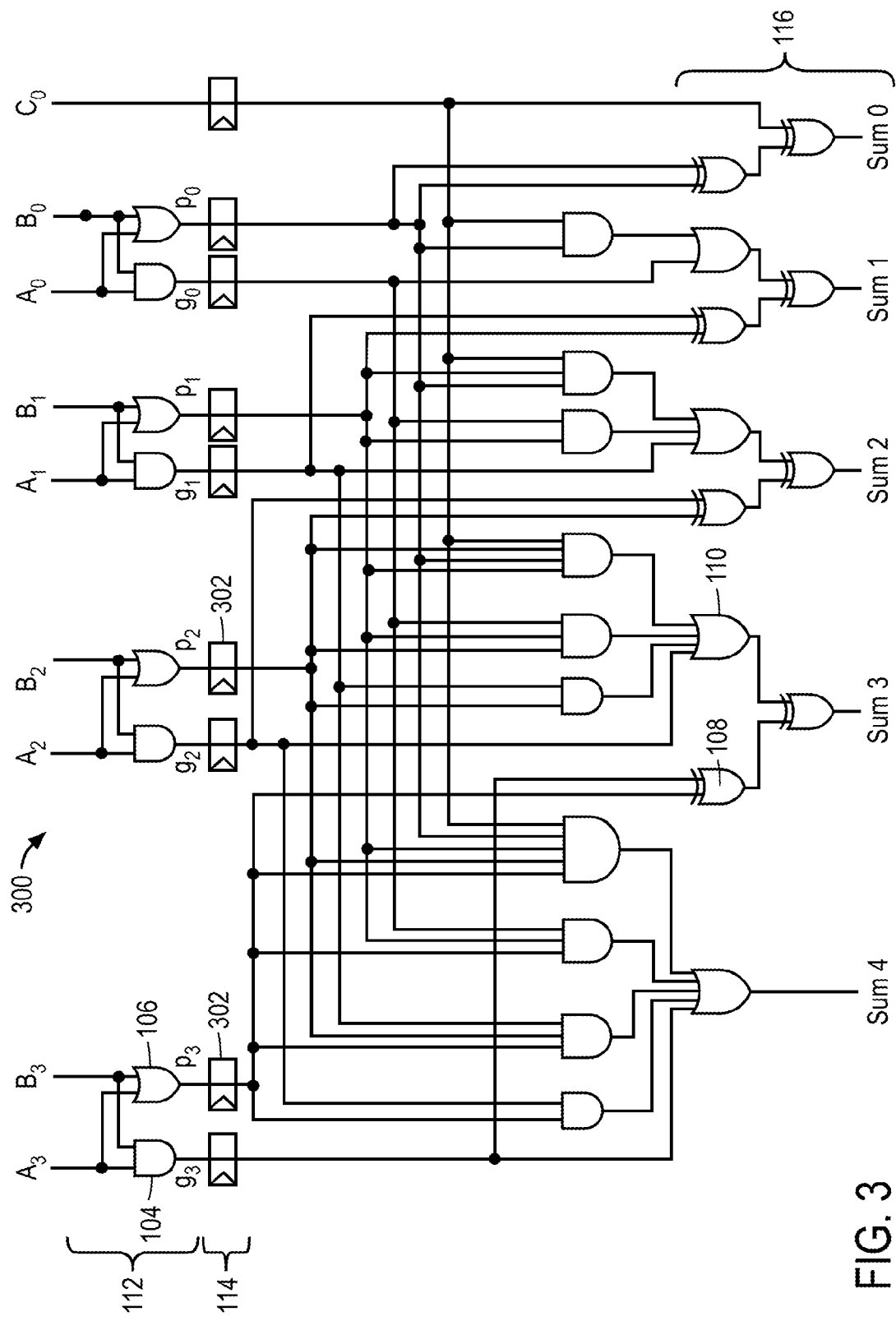
FIG. 3 illustrates a carry look-ahead adder configured in accordance with an embodiment of the invention.

FIG. 3 illustrates a carry look-ahead adder 300 configured in accordance with an embodiment of the invention. Observe that registers 302 are placed after the generate logic 104 and the propagate logic 106. However, only nine registers are used inside the functional unit, which is the same number of registers utilized outside the functional unit, as shown in FIG. 1. This stands in contrast to the seventeen interior registers required in the carry look-ahead adder 200 of FIG. 2.

Observe that the carry look-ahead adder 300 does not apply input signals as a sum operand to XOR gate 108. Rather, the generate and propagate bits are used as the sum operand for the XOR gate 108. An XOR produces a binary one output when the input operands differ. Table II is the XOR function truth table for two inputs A and B.

TABLE II

| Input A | Input B | Logical XOR Function |
|---------|---------|----------------------|
| 0 | 0 | 0 |
| 0 | 1 | 1 |
| 1 | 0 | 1 |
| 1 | 1 | 0 |

Table III illustrates that the same output at Table II is produced when the generate and propagate bits are subject to a Logical XOR operation. The inputs are the generate and propagate values from Table 1.

TABLE III

| Generate Value from logical AND function | Propagate Value from Logical OR function | Logical XOR Function for Generate and Propagate Values |
|---|---|---|
| 0 | 0 | 0 |
| 0 | 1 | 1 |
| 0 | 1 | 1 |
| 1 | 1 | 0 |

Thus, the invention does not rely upon the input signals as sum operands. Rather, the generate and propagate bits are used as sum operands. This allows for a significant reduction in the number of registers required within a functional unit. The reduced number of registers is possible because the input signals are not used after the generate and propagate bits are created and therefore do not need to be gated. That is, the input signals are received at an input stage 112, which includes the generate logic 104 and the propagate logic 106. A register stage 114 includes registers 302. An output stage 116 includes output stage logic to produce sums, in this case $Sum_0$, $Sum_1$, $Sum_2$, $Sum_3$ and $Sum_4$.

The invention exploits the equivalency of the logical functions in Table II and Table III. The inputs and outputs for rows 1, 2 and 4 in each of Tables II and III are identical. The input bits in row 3 of Tables II and III are reversed. Nevertheless, the output of the logical XOR operation is the same.

This result is attributable to the fact that the order of adding two numbers is irrelevant. Adding 1+0 is the same as adding 0+1. The sum in addition is both associative and commutative. Thus, sorting values to be added does not change the result.

The generate and propagate bits may be viewed as sorted values of the input. The generate bit is equal to the smaller of the two input bits, while the propagate bit is equal to the larger of the two input bits.

The smaller bit, call it the generate bit, is the logical AND of the two original bits since if either bit is zero, the logical AND of the two bits is zero, whereas if both bits are one, then the smaller of the two bits is also one and so is the AND value. The only way a column of two input values by itself can generate a carry into the next column is if both bits are one, in which case the logical AND of the two bits produces the generate bit. Thus, the smaller value of the sorted bits is the generate bit.

The larger bit in a column, call it the propagate bit, is the logical OR of the two original bits since if either bit is one, the logical OR of the two bits is one, whereas if both bits are zero, then the larger of the two bits is also zero and so is the OR value. The only way a column can propagate an input carry to the next column is if at least one of the two bits is one, so the logical OR of the two bits produces the propagate bit. Thus, the larger value of the sorted bits is the propagate bit.

In sum, in a carry look-ahead adder, the initial generate and propagate bits are formed by computing the logical AND and logical OR of the input bits. The registers may be placed after the initial generate and propagate bits are computed and only register the initial generate and propagate bits. Thus, the number of registers is the same as if the registers were placed before the initial generate and propagate bits are computed. The initial generate and propagate bits are then used in the carry look-ahead adder as both the generate and propagate bits as well as the bits to be added to get the desired sum.

Figure 4:
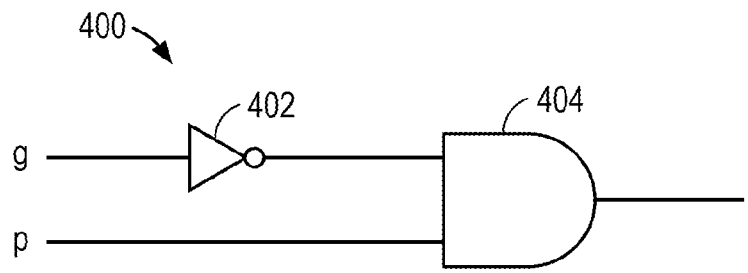
FIG. 4 illustrates an output stage circuit that may be utilized in accordance with an embodiment of the invention.

The same benefit of the invention may be secured with different summing logic. While XOR gates 108 are commonly used in carry look-ahead adders, it may be desirable to utilize other logic for speed purposes. For example, one can invert the generate signal and then apply the inverted generate signal and the propagate signal to a logical AND gate. FIG. 4 illustrates a circuit 400 that may replace XOR gate 108. Circuit 400 includes an inverter 402 for the generate bit and a logical AND gate 404 to process the inverted generate bit and the original propagate bit.

Figure 5:
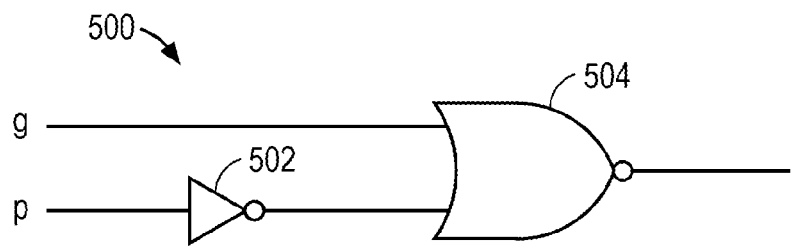
FIG. 5 illustrates another output stage circuit that may be utilized in accordance with an embodiment of the invention.

Alternately, one can invert the propagate signal and then apply the inverted propagate signal and the generate signal to a logical NOR gate. FIG. 5 illustrates a circuit 500 that may replace XOR gate 108. Circuit 500 includes an inverter 502 for the propagate bit and a logical NOR gate 504 to process the inverted propagate bit and the original generate bit.

Figure 6:
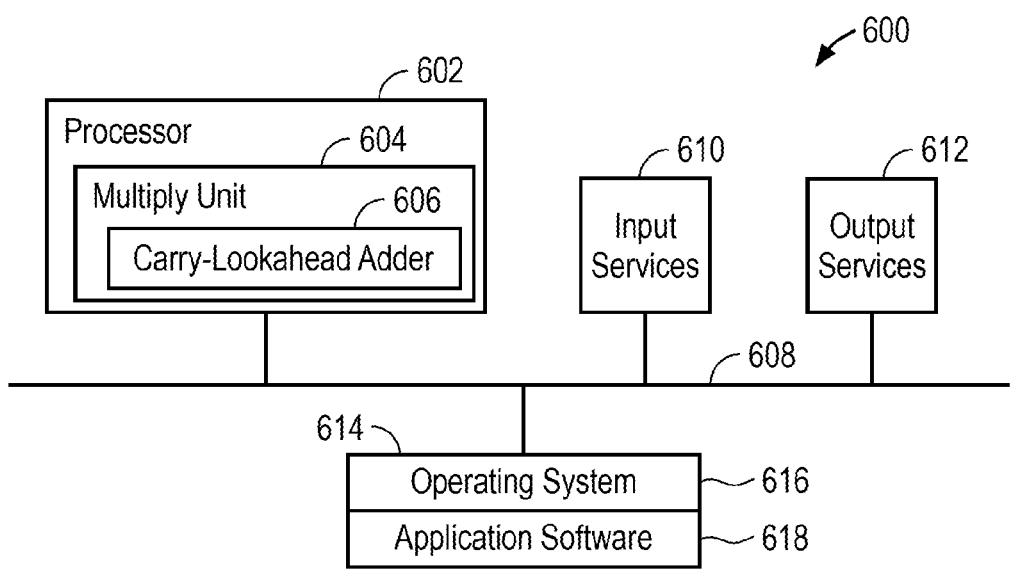
FIG. 6 illustrates a computer configured in accordance with an embodiment of the invention.

FIG. 6 illustrates the utilization of a carry look-ahead adder of the invention in a computer 600. The computer 600 includes a processor 602 with a multiply unit 604, which includes the disclosed carry look-ahead adder 606. The processor 602 is connected to a bus 608. Input devices 610 are connected to the bus 608. The input devices 610 may include a keyboard, mouse, touch display and the like. Output devices 612 are also connected to the bus 808. The output devices 612 may include a display, speaker, printer and the like. A memory 614 is also connected to the bus 608. The memory 614 may store an operating system 616 and one or more application software modules 618.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known non-transitory computer usable medium such as semiconductor, magnetic disk, or optical disc (e.g., CD-ROM, DVD-ROM, etc.). It is understood that a CPU, processor core, microcontroller, or other suitable electronic hardware element may be employed to enable functionality specified in software.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. An n bit carry look-ahead adder, comprising:
   an input stage to produce generate bits and propagate bits from input signals, wherein the propagate bits are generated by a logical OR of the input signals;
   an output stage to produce output sums exclusively from the generate bits, the propagate bits and carry in bits; and
   a register stage between the input stage and the output stage to gate the generate bits and the propagate bits,
   wherein n−1 of the output sums are derived from eXclusive OR gates directly coupled to an output of the register stage to process the generate bits and the propagate bits.

2. A processor, comprising:
   a multiply unit, wherein the multiply unit includes an n bit carry look-ahead adder comprising
      an input stage to produce generate bits and propagate bits from input signals, wherein the propagate bits are generated by a logical OR of the input signals;
      an output stage to produce output sums exclusively from the generate bits, the propagate bits and carry in bits; and
      a register stage between the input stage and the output stage to gate the generate bits and the propagate bits,
      wherein n−1 of the sums are derived from eXclusive-OR gates directly coupled to an input of the register stage to process the generate bits and the propagate bits.

3. A computer, comprising:
   a bus;
   input devices connected to the bus;
   output devices connected to the bus; and
   a processor connected to the bus, wherein the processor includes an n bit carry look-ahead adder comprising:
      an input stage to produce generate bits and propagate bits from input signals, wherein the propagate bits are generated by a logical OR of the input signals;
      an output stage to produce output sums exclusively from the generate bits, the propagate bits and carry in bits; and
      a register stage between the input stage and the output stage to gate the generate bits and the propagate bits,
      wherein n−1 of the output sums are derived from eXclusive-OR gates directly coupled to an output of the register stage to process the generate bits and the propagate bits.

4. A non-transitory computer readable storage medium, comprising executable instructions stored thereon, that when executed on a processor with an n bit carry look-ahead adder, perform the steps of:
   producing generate bits and propagate bits from input signals, wherein the propagate bits are generated by a logical OR of the input signals;
   gating the generate bits and the propagate bits; and
   producing output sums exclusive from the generate bits, the propagate bits and carry in bits,
   wherein n−1 of the output sums are derived from eXclusive-OR gates directly coupled to the gated generate bits and the propagate bits.

* * * * *